United States Patent [19]

Braymand

[11] Patent Number: 4,704,958

[45] Date of Patent: Nov. 10, 1987

[54] PASTEURIZATION APPARATUS

[75] Inventor: Robert Braymand, Villefranche sur Saône, France

[73] Assignee: Societe Nouvelle Baele Gangloff, Venissieux, France

[21] Appl. No.: 6,377

[22] Filed: Jan. 23, 1987

[30] Foreign Application Priority Data

Mar. 4, 1986 [FR] France ............................... 86 03613

[51] Int. Cl.$^4$ ............................................... A23B 7/00
[52] U.S. Cl. ....................................... 99/470; 53/127; 99/362; 99/455; 99/468; 99/483; 422/302; 422/304; 426/407; 426/521
[58] Field of Search ..................... 99/443 C, 452, 360, 99/453, 467, 468, 470, 475, 483, 516, 534, 536, 275, 361-363; 53/127; 422/25, 302, 304, 297; 426/397, 407, 412, 521; 165/66

[56] References Cited

U.S. PATENT DOCUMENTS

| | | | |
|---|---|---|---|
| 1,004,885 | 10/1911 | Loew | 99/483 X |
| 3,622,357 | 11/1971 | Tillman | 99/362 X |
| 3,850,089 | 11/1974 | Johnson et al. | 99/483 |
| 3,972,679 | 8/1976 | Ruig | 99/362 X |
| 4,164,590 | 8/1979 | Mencacci | 99/470 X |
| 4,218,486 | 8/1980 | Bieler et al. | 53/127 X |
| 4,331,629 | 5/1982 | Huling | 422/304 X |
| 4,441,406 | 4/1984 | Becker et al. | 99/483 |
| 4,606,262 | 8/1986 | Robinson, Jr. et al. | 99/483 X |
| 4,661,325 | 4/1987 | Noro et al. | 426/521 X |

Primary Examiner—Timothy F. Simone

Attorney, Agent, or Firm—Karl F. Ross; Herbert Dubno; Andrew Wilford

[57] ABSTRACT

A pasteurizing apparatus has a conveyor for longitudinally displacing containers to be pasteurized along a treatment path, a manifold extending longitudinally along the path between the path ends, and a multiplicity of longitudinally spaced sprayers connected to the manifold and directed transversely at the containers in the path, whereby each container passes under a succession of such sprayers while moving between the path ends. Conduits connected to the manifold at upstream and downstream locations and at a central location therebetween feed respective liquids at different temperatures to the locations and therethrough to the manifolds. A multiplicity of transverse partitions spaced axially along the manifold are each displaceable between a closed position substantially longitudinally blocking the manifold and an open position longitudinally unblocking it. Each partition is spaced longitudinally by at least one such sprayer from the adjacent partitions so that the partitions could subdivide the manifold into a multiplicity of compartments into one of which the upstream conduit opens, into another of which the downstream conduit opens, and into a third of which the central conduit opens. The partitions are selectively and controllably displaced between their positions to subdivide the manifold longitudinally into upstream, downstream, and central zones into which the respective conduits open.

9 Claims, 4 Drawing Figures

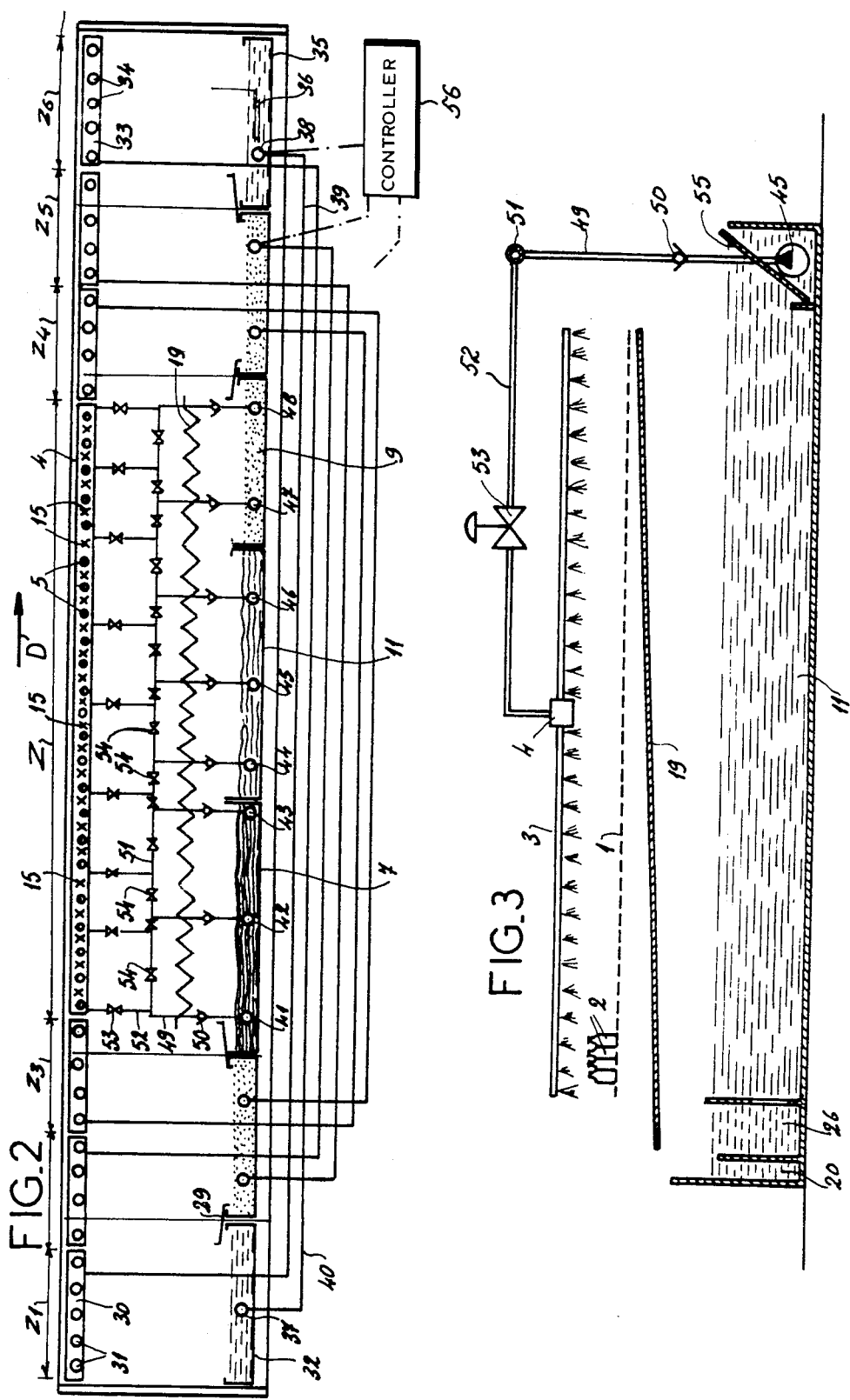

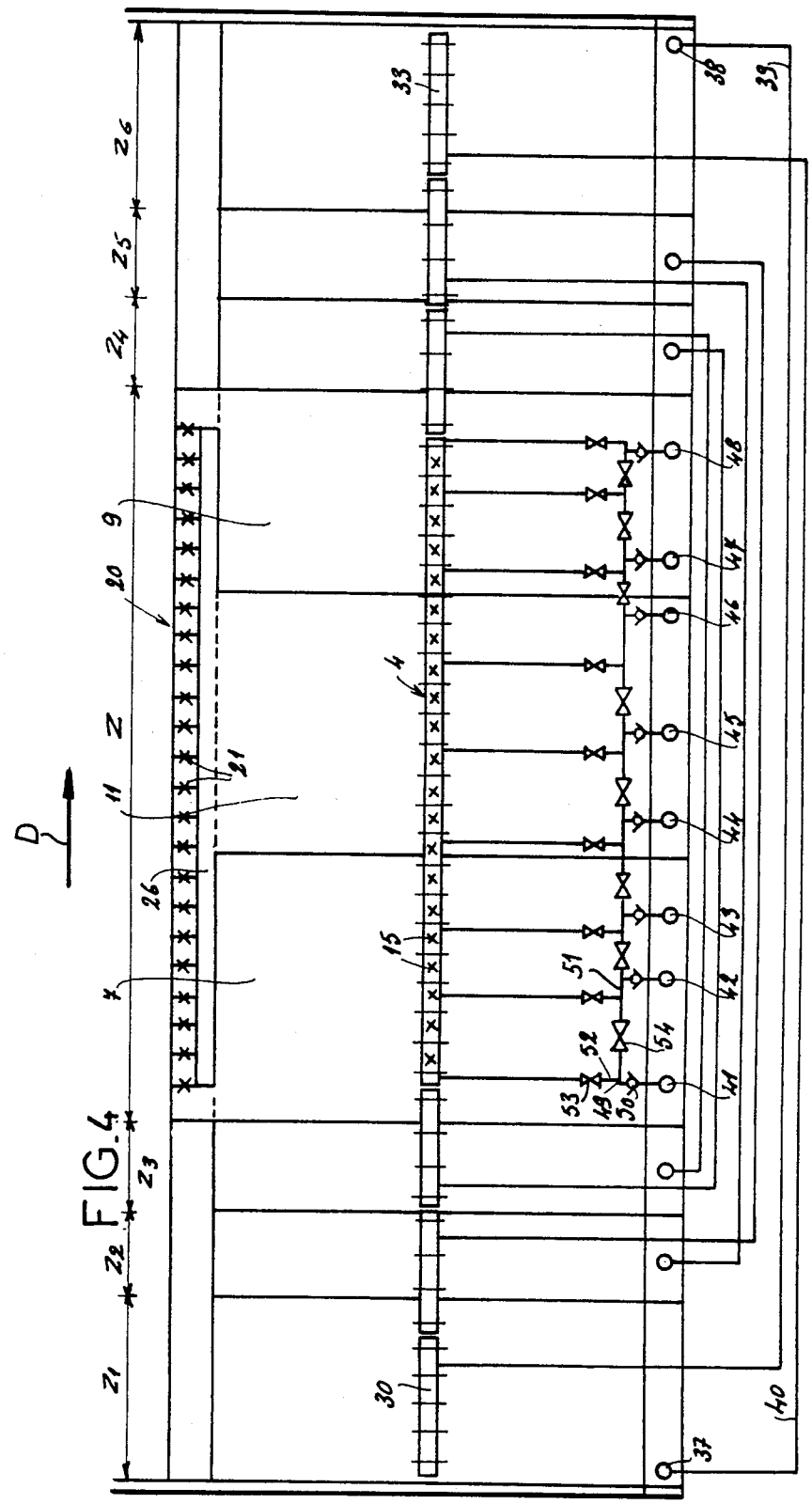

PASTEURIZATION APPARATUS

FIELD OF THE INVENTION

The present invention relates to an apparatus for heat-treating foodstuffs contained in closed recipients. More particularly this invention concerns the pasteurization of bottled foodstuffs.

BACKGROUND OF THE INVENTION

Pasteurization is the heating of a consumable item at a temperature and for a time sufficient to kill various bacteria that might be in the product. Excess heating can ruin the product, hereinafter presumed to be a foodstuff, while overly rapid or irregular heating must be avoided in order to prevent the recipient, hereinafter referred to as a bottle, from breaking due to uneven thermal stresses.

This heat-treatment is typically carried out in a conveyor-type system where the filled and closed bottles are moved through four separate zones. In the first preheating zone the items are gently brought up to a temperature near the pasteurization temperature, the heating being relatively slow to avoid damaging the containers with uneven thermal stresses. In the second prepasteurization zone they are brought rapidly up to the pasteurization temperature. Then in the third pasteurization zone the items are maintained at the pasteurization temperature for the treatment time so as to kill any bacteria. In the fourth cooling zone the temperature of the pasteurized items is reduced to prevent the food from overcooking and to recover useful heat. In each zone the heat exchange is between the contained items and a liquid which is sprayed over them. To this end the process takes place in a so-called tunnel through which the bottles move on a conveyor underneath a sequence of transverse sprayer beams from which a liquid, normally water, at the desired treatment temperature is sprayed on the bottles. Since the transport speed is invariably constant as the belt extends the full length of the tunnel and never stops, the only way to control the length of the treatment time in a particular zone is by controlling how many sprayer beams are supplied with water at the particular treatment temperature needed.

Different foodstuffs need different treatment times and temperatures in each of the four different zones, and some foodstuffs require more or less than three different treatments. This means that a treatment plant must substantially reconfigure its treatment line whenever the product changes, something that frequently cannot be done to achieve ideal results so a tradeoff must be made between the ideal or desired treatments and what the equipment will permit.

The switchover from one treatment method to another in a prior-art machine therefore necessitates complicated reconnecting of the sprayer beams to the different-temperature liquid sources. To do so it is necessary to reconnect a group of hoses, manipulate a great many valves, or otherwise undertake some fairly time-consuming job. The equipment necessary in an apparatus to make it work in more than one pasteurization mode is thus fairly complex and expensive. Furthermore while it is possible, albeit taking some time and employing some expensive equipment, to switch the feeds on the sprayer beams, it is virtually impossible to segregate the liquids of the various zones so they can be recirculated; instead much heat is lost even if complex zone-to-zone recirculation systems are used.

OBJECTS OF THE INVENTION

It is therefore an object of the present invention to provide an improved heat-treatment apparatus.

Another object is the provision of such a heat-treatment apparatus which overcomes the above-given disadvantages, that is which can readily be adapted to different processing modes and that can be set up for different treatment times.

SUMMARY OF THE INVENTION

A pasteurizing apparatus according to the invention has a conveyor for longitudinally displacing a succession of containers to be pasteurized in a row along a treatment path from an upstream end to a downstream end thereof, a manifold extending longitudinally along the path between the path ends, and a multiplicity of longitudinally spaced sprayers connected to the manifold and directed transversely at the containers in the path, whereby each container passes under a succession of such sprayers while moving between the path ends. Conduits connected to the manifold at upstream and downstream locations and at a central location therebetween feed respective liquids at different temperatures—typically a high temperature to the upstream zone for preheating, a lower but still high temperature in the central zone for the pasteurization, and a low temperature in the downstream zone for cooling—to the locations and therethrough to the manifolds. A multiplicity of transverse partitions spaced axially along the manifold are each displaceable between a closed position substantially longitudinally blocking the manifold and an open position longitudinally unblocking it. Each partition is spaced longitudinally by at least one such sprayer from the adjacent partitions so that when the partitions are all lowered (something not normally done) the manifold is subdivided into a multiplicity of compartments into one of which the upstream conduit opens, into another of which the downstream conduit opens, and into a third of which the central conduit opens. The partitions are selectively and controllably displaced between their positions to subdivide the manifold longitudinally into upstream, downstream, and central zones into which the respective conduits open, with at least one of the zones covering a plurality of the sprayers.

Thus with the system of this invention it is fairly easy to change the length of any treatment zone. In combination with the normal prior-art systems for changing the temperatures of the liquids fed to these zones, this makes it possible to reconfigure the system extremely easily. It is in fact possible to change the treatment virtually without stopping the apparatus when the partitions are controlled by a microprocessor that can almost instantaneously reset them in any programmed configuration.

According to this each of the sprayers is a horizontal and transversely extending sprayer beam connected to and supplied liquid exclusively by the longitudinally extending manifold. In addition the apparatus has respective catchments underneath the sprayer beams for catching generally only the liquid therefrom and for conducting same to respective spaced outlets, a reservoir adjacent the catchments and having upstream, downstream and central compartments connected via the respective conduits to the respective locations on the manifold, and a distributor trough between the reservoir and the reservoir and positioned to receive liquid from all of the outlets of the catchments and having upstream, central, and downstream outlets opening into the respective reservoir compartments. A distributor subdivides the trough at two locations between the trough outlets and at locations movable along the trough outlets for forming upstream, downstream, and central trough compartments drained by the respective trough outlets and each aligned with at least one of the catchment outlets.

Each of the catchments of this invention is a transversely extending gutter extending underneath the conveyor means and beneath the respective sprayer and having a lower end constituting the respective catchment outlet. The distributor is a multiplicity of transverse partitions spaced axially along the trough and each displaceable between a closed position substantially longitudinally blocking the trough and an open position longitudinally unblocking it, each trough partition being spaced longitudinally by at least one catchment outlet from the adjacent trough partitions.

It is therefore possible to segregate the system into respective recirculating loops at each of the zones of different temperature. In this manner the liquid coming off the bottles at one location is recovered and recirculated to the sprayers of this location. As a result it is possible to use a very heavy flow for very good heat exchange while still not wasting valuable heat.

In accordance with another inventive feature the trough outlets are below the catchment outlets and above the respective reservoir compartments. More particularly the trough had upwardly open cutouts forming the respective outlets.

Further according to this invention all of the partitions are vertically displaceable vanes sealingly engageable with the respective manifold and trough. Such construction is extremely simple while being easy to control with simple solenoids raising and lowering the partitions like sluice gates. In fact the trough partitions are normally operated by the controller synchronously with the respective manifold partitions as there is at least one trough partition for each manifold partition. This can be done simply by connecting the respective solenoids in parallel.

The catchments according to the invention run transversely and the partitions of the trough are at the same longitudinal spacing as the partitions of the manifold.

DESCRIPTION OF THE DRAWING

The above and other features and advantages will become more readily apparent from the following, reference being made to the accompanying drawing in which:

FIG. 2 is a side schematic view of a more elaborate pasteurizing apparatus in accordance with the invention;

FIG. 3 is a cross section through the apparatus of FIG. 2; and

FIG. 4 is a partially schematic top view of the system of FIGS. 2 and 3.

SPECIFIC DESCRIPTION

Figure 1:
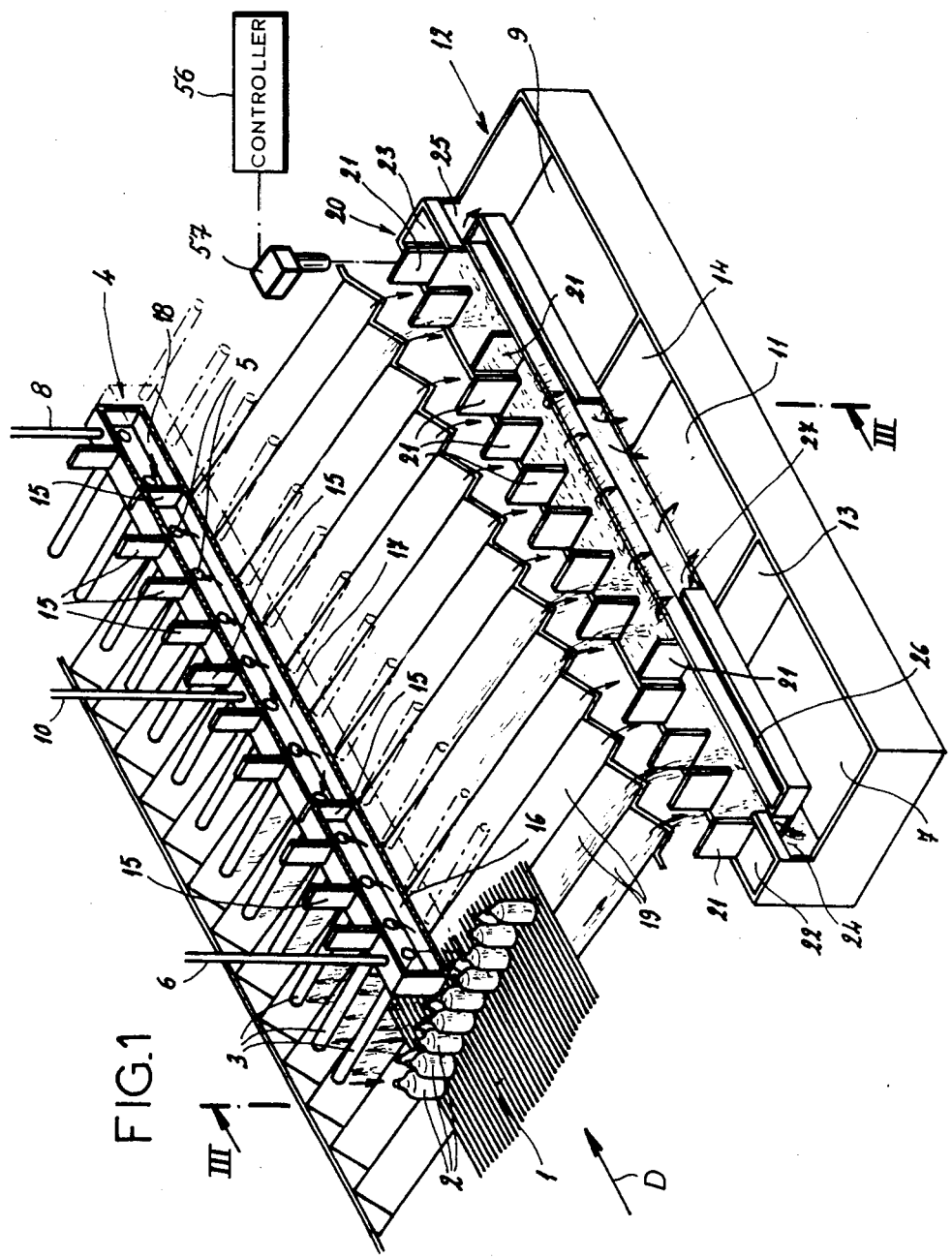
FIG. 1 is a small-scale, perspective, and partly broken-away view of the pasteurizing apparatus according to this invention in a fairly simple embodiment.

As seen in FIG. 1 a three-stage apparatus according to this invention has a belt-type conveyor 1 through which liquid can pass vertically that moves a succession of sealed bottles 2 in a direction D at a constant speed underneath thirteen horizontal spraying beams 3 that are mounted on a central feed manifold 4 and that extend transverse to the direction D to spray liquid down on the passing bottles 2. Each of the spraying beams 3 is a hollow tube with downwardly directed outlet holes or nozzles and opens via a hole 5 into the manifold 4 which is fed at its upstream (relative to the direction D as hereinafter) end by a conduit 6, at its downstream by a separate conduit 8, and centrally by a conduit 10. As described in more detail below the the conduits 6, 8, and 10 are fed from respective upstream, downstream, and central compartments 7, 9, and 11 from a reservoir or sump 12 subdivided partitions 13 and 14 into the compartments 7, 9, and 11.

The manifold 4 is provided between adjacent openings 5 with twelve crosswise movable partitions or vanes 15 that can be moved between an upper or outer position largely outside of the manifold 4 and a lower or inner position substantially blocking flow in the direction D within this manifold 4. These partitions 15 are individually controllable, for instance remotely by means of respective solenoids 57, and in the illustrated arrangement the fourth and eleventh from the upstream end are down and all of the others are up. This subdivides the interior of the manifold 4 into a four-sprayer prepasteurization compartment 16, a seven-sprayer central pasteurization compartment 17, and a two-sprayer cooling compartment 18.

Underneath the conveyor 1 is a floor forming thirteen crosswise gutters 19 each underneath a respective one of the sprayers 3 and inclined to conduct liquid dripping off the bottles 2 and conveyor 1 overhead toward the reservoir 12. A collection and distribution vessel 20 at the inside edge of the reservoir 12 is subdivided by fourteen partitions 21 into thirteen compartments each directly under the lateral downstream end of a respective one of the gutters 19 and into an extreme upstream compartment 22 and an extreme downstream compartment 23, for a total of fifteen. The partitions 21 operate identically to the partitions 15, being remotely and individually controlled, that is with each partition 15 moving vertically with the respective partition 21, the latter being slightly downstream from the former in the direction D in each case. The upstream compartment 22 opens via an outlet 24 into the upstream sump compartment 7 and the downstream compartment 23 opens via an outlet 25 into the downstream compartment 9.

Immediately adjacent but slightly below the collector 20 between the first and thirteenth partitions 21 is a collecting trough 26 that opens via an outlet 27 into the central sump compartment 11. In the illustrated arrangement the fifth and twelfth partitions 21 are dropped and all the other partitions 21 are up. Thus the liquid draining from the four upstream gutters 19 of the upstream manifold compartment 16 will be diverted into the sump compartment 7, the liquid from the two upstream gutters 19 of the downstream compartment 18 into the sump compartment 9, and the liquid from the seven central gutters 19 of the middle compartment 17 into the trough 26 and thence into the central sump compartment 11.

The device described above operates as follows:

The liquid—normally water—in each of the sump compartments 7, 9, and 11 is maintained at the desired temperature in the manner well known in the art by heating it, as for instance by passing steam through it, or cooling it, as for instance by the admixture of fresh cold liquid. In FIG. 1 the liquid of the sump 7 is maintained at 70° C., in the sump 11 at 60° C., and in the sump 9 at 45° C. The vanes or partitions 15 and 21 are then set as shown so that, assuming that it takes time T for the bottles 2 to pass the full length of the manifold 4, 4T/13 will be the prepasteurization treatment time, 7T/13 will be the pasteurization treatment time, and 2T/13 will be the postpasteurization treatment time. Obviously any of these treatment times could be reduced to T/13 or increased to T, the latter only being possible if only one treatment zone is needed.

FIGS. 2 and 4 show an arrangement having three standard prior-art preheating zones $Z_1$, $Z_2$, and $Z_3$ having a manifold 30, sprayers 31, and a sump 32 and cooling zones $Z_4$, $Z_5$, and $Z_6$ having a manifold 33, sprayers 34, and a sump 35. Feed tubes 36 provide steam or cold water as needed and as well known in the art to maintain the desired temperatures. In addition the sump 35 of the furthest downstream zone $Z_6$ is connected by a pump 38 and conduit 39 to the upstream zone $Z_1$ and the zones $Z_4$, and $Z_5$ are similarly connected to the zones $Z_3$ and $Z_2$ as is standard since the liquid heated up by the bottles in the cooling zones is normally at just the right temperature for efficient reuse in prepasteurization heating. Deflectors 29 are provided to ensure that the liquid from the various zones flows into the proper sumps.

The central zone Z here roughly corresponds to the apparatus of FIG. 1 and the same reference numerals as in that figure are used also in FIGS. 2 and 4. In this arrangement the sump 7 is provided with three pumps 41, 42, and 43, the sump 11 also with three pumps 44, 45, and 46, and the sump 9 with two pumps 47 and 48. As shown in detail for the pump 45 of sump 11, each pump receives liquid through a filter 55 and gives it out through an outlet conduit 49 provided with an outgoing check valve 40 and connected to a feed pipe 41 extending the full length of the zone Z and connected to all the other conduits 49. In addition connected between the conduit 51 and the manifold 4 are a plurality of transverse feeders 52 provided with respective solenoid-controlled flow-control valves 52, with one such feeder 52 at each end of the manifold 4 and spaced therebetween every two or three sprayers 3. Here there being twenty-three such sprayers 3 and nine such feeder conduits 52 for an average of about three sprayers 3 between adjacent feeders 52. In addition the conduit 41 is provided with fourteen shutoff valves 54 so the conduits 49 and 52 except those at the ends can be completely cut off from one another.

A normal operational mode for this machine would be with the zone Z subdivided into a prepasteurization zone and a pasteurization zone of about equal lengths. To do this all of the partitions 15 are lifted but the centermost one and similarly all of the partitions 21 of the distributor trough are open but the center one. The pumps 41 through 46 are run, but not the pumps 47 and 48. The valve 54 of the tube 41 immediately upstream of the lowered partition 15 and all the other valves 54 are left open.

If, for instance, it becomes necessary to change modes and use the entire region downstream of the twelfth or center partition 15 for cooling and to divide the portion upstream thereof into two equal-length compartments for prepasteurization and pasteurization, the pumps 47 and 48 are started and the pumps 45 and 46 stopped, the seventh valve 54 that is immediately upstream of the center partition 15 is also closed, and the fifth partition 15 that is downstream of the second valve 54 is dropped. In addition the pump 43 is stopped and the partition 21 corresponding to the dropped fifth partition 15 is also dropped.

A central programmable controller 56 is connected to all of the valves and pumps and to the solenoids 57 controlling the various partitions as well as to any heaters or chillers associated with the sumps. This makes it possible for a processing plant to change operational modes without even shutting down a production line, with only a brief gap being left in the run between subsequent groups of bottles being treated differently.

I claim:
1. A pasteurizing apparatus comprising:
   conveyor means for longitudinally displacing a succession of foodstuff-holding containers to be pasteurized in a row along a treatment path from an upstream end to a downstream end thereof;
   a manifold extending longitudinally along the path between the path ends;
   a multiplicity of longitudinally spaced sprayers connected to the manifold and directed transversely at the containers in the path, whereby each container passes under a succession of such sprayers while moving between the path ends;
   means including conduits connected to the manifold at upstream and downstream locations and at a central location therebetween for feeding respective liquids at different temperatures to the locations and therethrough to the manifolds;
   a multiplicity of transverse partitions spaced axially along the manifold and each displaceable between a closed position substantially longitudinally blocking the manifold and an open position longitudinally unblocking it, each partition being spaced longitudinally by at least one such sprayer from the adjacent partitions, whereby when the partitions are all lowered the manifold is subdivided into a multiplicity of compartments into one of which the upstream conduit opens, into another of which the downstream conduit opens, and into a third of which the central conduit opens; and
   control means for selectively and controllably displacing the partitions between their positions and thereby subdividing the manifold longitudinally into upstream, downstream, and central zones into which the respective conduits open, at least one of the zones covering a plurality of the sprayers.
2. The pasteurizing apparatus defined in claim 1 wherein each of the sprayers is a horizontal and transversely extending sprayer beam connected to and supplied liquid exclusively by the longitudinally extending manifold.
3. The pasteurizing apparatus defined in claim 2, further comprising:
   means including respective catchments underneath the sprayer beams for catching generally only the liquid therefrom and for conducting same to respective spaced outlets;
   a reservoir adjacent the catchments and having upstream, downstream and central compartments connected via the respective conduits to the respective locations on the manifold;
   a distributor trough between the reservoir and the reservoir and positioned to receive liquid from all of the outlets of the catchments and having up- stream, central, and downstream outlets opening into the respective reservoir compartments; and distributor means for subdividing the trough at two locations between the trough outlets and at locations movable along the trough outlets for forming upstream, downstream, and central trough compartments drained by the respective trough outlets and each aligned with at least one of the catchment outlets.

4. The pasteurizing apparatus defined in claim 3 wherein each of the catchments is a transversely extending gutter extending underneath the conveyor means and beneath the respective sprayer and having a lower end constituting the respective catchment outlet.

5. The pasteurizing apparatus defined in claim 3 wherein the distributing means includes:

a multiplicity of transverse partitions spaced axially along the trough and each displaceable between a closed position substantially longitudinally blocking the trough and an open position longitudinally unblocking it, each trough partition being spaced longitudinally by at least one catchment outlet from the adjacent trough partitions.

6. The pasteurizing apparatus defined in claim 1 wherein the trough outlets are below the catchment outlets and above the respective reservoir compartments.

7. The pasteurizing apparatus defined in claim 5 wherein the partitions are vertically displaceable vanes sealingly engageable with the respective manifold and trough.

8. The pasteurizing apparatus defined in claim 7 wherein the trough partitions being operated by the control means synchronously with the respective manifold partitions, there being at least one trough partition for each manifold partition.

9. The pasteurizing apparatus defined in claim 3 wherein the catchments run transversely and the partitions of the trough are at the same longitudinal spacing as the partitions of the manifold.

* * * * *